US008232958B2

(12) United States Patent
Tolbert

(10) Patent No.: US 8,232,958 B2
(45) Date of Patent: Jul. 31, 2012

(54) HIGH-CONTRAST BACKLIGHT

(75) Inventor: William H. Tolbert, Malmo (SE)

(73) Assignee: Sony Mobile Communications AB, Lund (SE)

(*) Notice: Subject to any disclaimer, the term of this patent is extended or adjusted under 35 U.S.C. 154(b) by 997 days.

(21) Appl. No.: 12/042,926

(22) Filed: Mar. 5, 2008

(65) Prior Publication Data

US 2009/0225022 A1   Sep. 10, 2009

(51) Int. Cl.
*G09G 3/38* (2006.01)
*G09G 3/19* (2006.01)
*G09G 3/00* (2006.01)
*G02F 1/15* (2006.01)

(52) U.S. Cl. ............ 345/105; 345/49; 345/30; 359/245; 359/265

(58) Field of Classification Search .............. 345/30, 345/45, 49, 55, 84, 105; 359/245, 265
See application file for complete search history.

(56) References Cited

U.S. PATENT DOCUMENTS

| | | | |
|---|---|---|---|
| 6,515,787 B1 * | 2/2003 | Westfall et al. | ............... 359/265 |
| 6,647,366 B2 | 11/2003 | Wang et al. | |
| 6,822,778 B2 | 11/2004 | Westfall et al. | |

FOREIGN PATENT DOCUMENTS

| | | |
|---|---|---|
| WO | WO 00/41378 | 7/2000 |
| WO | WO 2005/017931 | 2/2005 |
| WO | WO 2005/024869 | 3/2005 |
| WO | WO 2008/056276 | 5/2008 |

OTHER PUBLICATIONS

Notification of Transmittal of the International Search Report and the Written Opinion of the International Searching Authority, or the Declaration, dated Jan. 27,2009, 15 pages.
Richardson et al., "Switchable Mirrors Based on Nickel-Magnesium Films", University of California, Accepted for publication in Applied Physics Letters, Jan. 2001, 8 pages.
Slack et al., "Metal Hydride Switchable Mirrors: Factors Influencing Dynamic Range and Stability", Solar Energy Materials & Solar Cells, vol. 90, Issue 4, Mar. 6, 2006, pp. 485-490.
Deb, "Photovoltaic-Integrated Electrochromic Device for Smart-Window Applications", National Renewable Energy Laboratory Conference Paper to be held Jul. 1-7, 2000, May 2000, 9 pages.

* cited by examiner

*Primary Examiner* — Srilakshmi K Kumar
(74) *Attorney, Agent, or Firm* — Sreenivas Vedantam; Moore & Van Allen

(57) ABSTRACT

A method and device for providing a display having increased viewability are provided. The display assembly includes a backlight layer, an electrochromic layer formed over the backlight layer, a surface layer formed over the electrochromic layer and including at least one substantially translucent graphical element thereon, and a power supply. The electrochromic layer is switchable between a substantially transparent state and a substantially reflective state upon application of a switching voltage from the power supply, where the state being selected is based on a lighting condition of the display assembly.

20 Claims, 9 Drawing Sheets

HIGH-CONTRAST BACKLIGHT

BACKGROUND

The popularity and use of mobile terminals or mobile telephones has skyrocketed over the past 20 years. Although variations exist, many of these devices include some form of input device, such as a keypad, a QWERTY keyboard, etc. Furthermore, these devices are often designed to be used or operated in a variety of different lighting environments, such as indoors, under incandescent or fluorescent lighting; outdoors in direct sunlight; in the dark, etc. Accordingly, visibility of keys or key identifiers may differ, based on the light conditions in which the device is to be used.

Known keyboards and keypads typically include either printed key identifiers or backlit keys. With printed key identifiers, no light source is used to facilitate viewing of the keys in dark environments. Conversely, backlit keys or keypads typically use some form of light source to light up the key identifiers for at least a predetermined period of time. Unfortunately, existing backlighting systems may result in key identifiers lacking sufficient contrast for efficient viewing in high light environments.

SUMMARY OF THE INVENTION

According to one aspect a display assembly may include a backlight layer, an electrochromic layer formed over the backlight layer, a surface layer formed over the electrochromic layer and including at least one substantially translucent graphical element thereon, and a power supply. The electrochromic layer may be switchable between a substantially transparent state and a substantially reflective state upon application of a switching voltage from the power supply, where the state being selected is based on a lighting condition of the display assembly.

Additionally, the display assembly may include logic configured to control the display assembly, the logic providing a first mode of operation comprising placing the electrochromic layer into the substantially transparent state and activating the light source, such that viewing of the graphical element on the surface layer is enhanced by light from the backlight layer.

Additionally, the logic may be further configured to provide a second mode of operation comprising placing the electrochromic layer into the substantially reflective state, such that viewing of the graphical element on the surface layer is enhanced by ambient light reflected from the electrochromic layer.

Additionally, the logic may be further configured to deactivate the backlight layer in the second mode of operation.

Additionally, the display assembly may include a light sensor for determining an ambient lighting condition of the display assembly, where the lighting condition of the display assembly is based on the ambient lighting condition.

Additionally, the surface layer may include a keypad surface layer, where the at least one graphical element corresponds to a number of keys on the keypad surface layer.

Additionally, the display assembly may include a printed circuit board (PCB) layer including a number of contacts corresponding to the number of keys and a switching layer formed over the PCB layer and including a number of switch elements corresponding to the number of contacts and the number of keys. Depression of a selected key of the number of keys may result in physical contact between the switch element and the contact corresponding to the selected key.

Additionally, one of the backlight layer or the surface layer may include a number of protrusions corresponding to the number of switch elements, the number of contacts, and the number of keys, where the number of protrusions facilitate contact between the number of keys and the number of switch elements.

Additionally, the surface layer may include a number of distinct key elements.

Additionally, the electrochromic layer may include a reflective transition metal hydride.

Additionally, the reflective transition metal hydride comprises a magnesium nickel alloy.

Additionally, the electrochromic layer may include a first transparent conductor layer; an ion storage layer formed over the first transparent conductor layer; an ion conducting layer formed over the ion storage layer; a reflective electrochromic layer formed over the ion conducting layer; and a second transparent conductor layer formed over the reflective electrochromic layer. The ion storage layer and the reflective electrochromic layer may be configured to receive the switching voltage from the power supply.

Additionally, each of the first electrochromic layer and the second electrochromic layer may exhibit reflectance of approximately 80-100% while in the substantially reflective state and transmittance of approximately 80-100% while in the substantially transparent state.

In another aspect, a device may include a keypad assembly; a processor; and a power supply. The keypad assembly may include a surface layer including a plurality of substantially translucent graphical elements thereon; an electrochromic layer formed below the surface layer; and a backlighting assembly formed below the electrochromic layer. The electrochromic layer may be switchable between a substantially transparent state and a substantially reflective state upon a command from the processor to apply a switching voltage from the power supply to the electrochromic layer, the state being selected based on an ambient lighting condition of the device.

Additionally, the processor may be configured to activate the backlighting assembly when the electrochromic layer is in the substantially transparent state and deactivate the backlighting assembly when the electrochromic layer is in the substantially reflective state.

Additionally, the electrochromic layer may include at least a reflective transition metal hydride layer.

Additionally, the device may include a light sensor for sensing the ambient lighting condition of the device, where the processor is configured to switch the electrochromic layer into the substantially transparent state when the light sensor senses ambient light below a predetermined threshold, and where the processor is configured to switch the electrochromic layer into the substantially reflective state when the light sensor senses ambient light above the predetermined threshold.

In yet another aspect, a method may include identifying a lighting condition associated with a display, where the display includes a surface layer having a number of substantially translucent graphical elements formed thereon; and placing an electrochromic layer formed below the surface layer into one of a substantially transparent state or a substantially reflective stated based on the identified lighting condition.

Additionally, the identified lighting condition may include one of a bright light condition and a non-bright light condition. The method may further include placing the electrochromic layer into the substantially transparent state when the identified lighting condition comprises the non-bright light condition; and placing the electrochromic layer into the substantially reflective state when the identified lighting condition comprises the bright light condition.

Additionally, the method may include activating a backlight assembly formed below the electrochromic layer when the electrochromic layer is placed into the substantially transparent state to illuminate the number of substantially translucent graphical elements; and deactivating the backlight assembly when the electrochromic layer is placed into the substantially reflective state.

BRIEF DESCRIPTION OF THE DRAWINGS

Reference is made to the attached drawings, wherein elements having the same reference number designation may represent like elements throughout.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Figure 1:
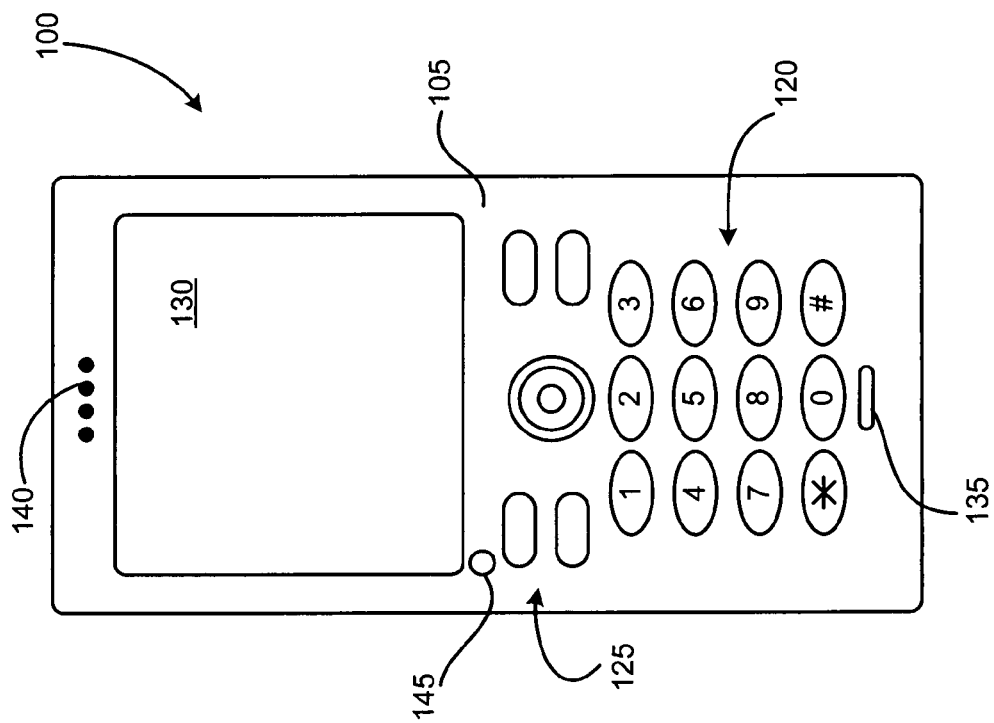
FIG. 1 is a front view of an exemplary mobile terminal in which methods and systems consistent with the invention may be implemented.

FIG. 1 is a front view of an exemplary mobile terminal device 100 in which systems and methods consistent with the invention may be implemented. The invention is described herein in the context of a mobile terminal. As used herein, the term "mobile terminal" may include a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices. Mobile terminal 100 may also optionally include a camera. Moreover, mobile terminals may include a wide variety of form factors including, candy bar, clamshell, flip, slider, and swivel or pivot style. It should be understood that the principles of the invention may applied to mobile terminals regardless of form factor.

Referring to FIG. 1, mobile terminal 100 may include housing or cover 105, keypad assembly 120, control keys 125, display 130, microphone 135, speaker 140, and light sensor 145. Housing 105 may include a structure configured to hold devices and components used in mobile terminal 100. For example, main housing 105 may be formed from plastic, metal, or a composite and may be configured to support keypad assembly 120, control keys 125, a display 130, a microphone 135, a speaker 140, and a light sensor 145 as well as additional elements not shown in FIG. 1, such as a rechargeable battery or power source, on or more wireless transceivers, and a number circuit or processor elements configured to facilitate operation of mobile terminal 100.

Keypad assembly 120 may include devices and/or logic that can be used to operate mobile terminal 100. Keypad assembly 120 may further be adapted to receive user inputs, directly or via other devices, such as via a stylus for entering information into mobile terminal 100. In one implementation, communication functions of mobile terminal 100 may be controlled by activating keys in keypad assembly 120. The keys may have key information associated therewith, such as numbers, letters, symbols, etc. The user may operate keys in keypad assembly 120 to place calls, enter digits, commands, and text messages, into mobile terminal 100. Designated functions of keys may form and/or manipulate images that may be displayed on display(s) 140 and/or 150. In some implementations, the key information may be provided on the keys, while in other implementations, the key information may be provided adjacent to or in proximity to associated keys.

Control keys 125 may include buttons that permit a user to interact with communication device 100 to cause communication device 100 to perform specified actions, such as to interact with displays 140 and 150, etc. For example, user manipulation of control keys 125 may cause elements of a user interface provided on display 140 to be highlighted or selected, thereby enabling subsequent interaction with the selected element or elements.

In some implementations, keypad assembly 120 and/or control keys 125 may include a capacitive touch keypad. Capacitive touch keypads include a surface area responsive to a user's touch by measuring or monitoring a capacitance or inductance across the surface area. Capacitive touch keypads may include configurable displays which provide for various configurations of user-selectable keys, icons, or other graphical elements thereon. Selection of the graphical elements by a user may not require physical manipulation of a switch assembly or other button-like elements.

According to one implementation described herein, keypad assembly 120 and/or control keys 125 may be provided with an enhanced backlighting mechanism for improving readability in a variety of lighting conditions. Additional elements relating to keypad assembly 120 and control keys 125 will be set forth in additional detail below with respect to FIGS. 3A-5.

Display 130 may include one or more devices that provide visual images or information to a user. For example, display 130 may provide graphic information regarding incoming/outgoing calls, text messages, games, phonebooks, the current date/time, volume settings, etc., to a user of mobile terminal 100. Implementations of display 130 may be implemented as a black and white or color flat panel display, such as a liquid crystal display, an organic light emitting diode (OLED) display, etc.

Microphone 135 may include a device that converts speech or other acoustic signals into electrical signals for use by mobile terminal 100. Microphone 135 may also include an analog to digital converter to convert input analog signals into digital signals. Microphone 135 may be located anywhere on mobile terminal 100 and may be configured, for example, to convert spoken words or phrases into electrical signals for use by mobile terminal 100.

Speaker 140 may include a device that provides audible information or alerts to a user of mobile terminal 100. Speaker 140 may be located anywhere on mobile terminal 100 and may function, for example, as an earpiece when a user communicates using mobile terminal 100. Speaker 140 may include several speaker elements provided at various locations within mobile terminal 100. Speaker 140 may also include a digital to analog converter to convert digital signals into analog signals. Speaker 140 may also function as an output device for a ringing signal indicating that an incoming call is being received by communication device 100. Additionally, speaker 140 may function as an output device for audible alerts indicating receipt of text or multimedia messages, emails, or instant messages, as well as alerts indicating occurrence of reminders or the like.

Light sensor 145 may include a device for detecting ambient light or light directed toward light sensor 145. In one implementation, light sensor 145 may be sensitive to variations in detected light using any suitable technology, such as photodiodes or other photoelectric components.

Figure 2:
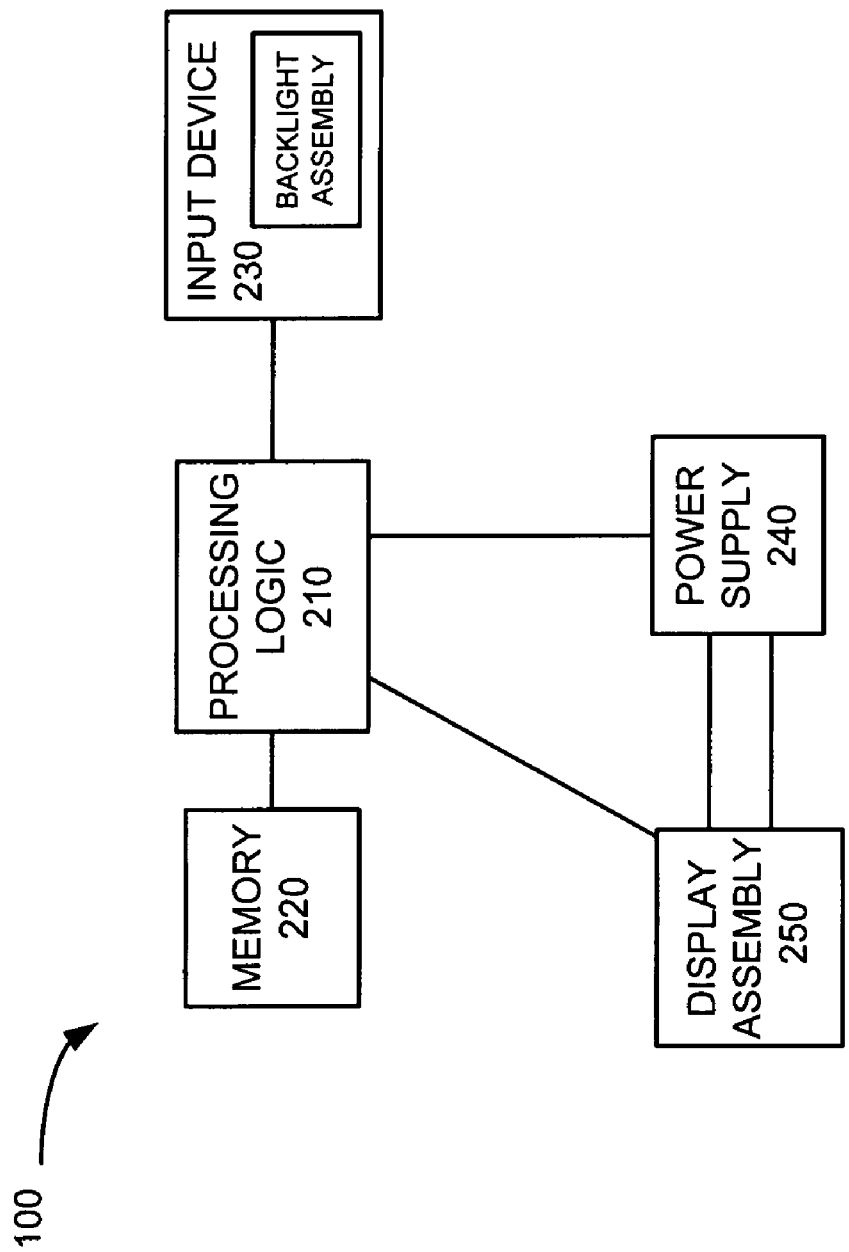
FIG. 2 is a block diagram illustrating components of the mobile terminal of FIG. 1 according to an exemplary implementation consistent with the invention.

FIG. 2 is a diagram illustrating some components of mobile terminal 100 according to an exemplary implementation consistent with the described embodiments. Mobile terminal 100 may include processing logic 210, a memory 220, an input device 230, a power supply 240, and a display assembly 250. One skilled in the art would recognize that the mobile terminal 100 may be configured in a number of other ways and may include other or different elements, such as one or more radio frequency (RF) antennas, a transceiver, modulator/demodulator, encoder/decoder, a speaker, etc.

Processing logic 210 may include a processor, microprocessor, an application specific integrated circuit (ASIC), field programmable gate array (FPGA) or the like. Processing logic 210 may execute software programs or data structures to control operation of mobile terminal 100. Memory 220 may include a random access memory (RAM) or another type of dynamic storage device that stores information and instructions for execution by processing logic 210; a read only memory (ROM) or another type of static storage device that stores static information and instructions for use by processing logic 210; and/or some other type of magnetic or optical recording medium and its corresponding drive. Instructions used by processing logic 210 may also, or alternatively, be stored in another type of computer-readable medium accessible by processing logic 210. A computer-readable medium may include one or more memory devices and/or carrier waves.

Input device 230 may include any mechanism that permits an operator to input information to mobile terminal 100, such as a microphone (e.g., microphone 135), a keyboard, a keypad (e.g., keypad 120 and control keys 125), a mouse, a pen, stylus, touch screen display, voice recognition and/or biometric mechanisms, etc. Input device 230 may also include one or more buttons that allows a user to receive a menu of options associated with, for example, display assembly 250. As mentioned briefly above, input device 230 may include a backlight assembly for dynamically switching between a transmissive-type backlight and a reflective-type backlight. In one exemplary implementation consistent with embodiments described herein, input device 230 may be configured to provide enhanced viewability of a keypad, keyboard, or other input device in different lighting environments. Specificities of input device 230 will be described in detail below.

Power supply 240 may supply power to components of mobile terminal 100, such as display assembly 250, input device 230, etc. Display assembly 250 may include hardware and/or software components associated with display 130. For example, display assembly 250 may include one or more displays to facilitate the display of various types of information to a user including, for example, telephone call information, phone or address book information, etc. Additionally, display assembly 250 may provide one or more high resolution interfaces for viewing interactive menus, web browsers, photographs, etc.

In one embodiment, mobile terminal 100, may perform processing associated with, for example, dynamically modifying a backlighting configuration of input device 230 (e.g., keypad assembly 120 and/or control keys 125 of FIGS. 1A and 1B). Mobile terminal 100 may perform these operations in response to processing logic 210 executing sequences of instructions contained in a computer-readable medium, such as memory 220 and optionally in response to user interaction through input device 230. It should be understood that a computer-readable medium may include one or more memory devices. Execution of sequences of instructions contained in memory 220 causes processing logic 210 and/or input device 230 to perform operations that will be described hereafter. As described below, hard-wired circuitry may be used instead of, or in combination with, software instructions to implement processes consistent with embodiments described herein. Thus, implementations consistent with embodiments described herein are not limited to any specific combination of hardware circuitry and software.

Figure 3A:
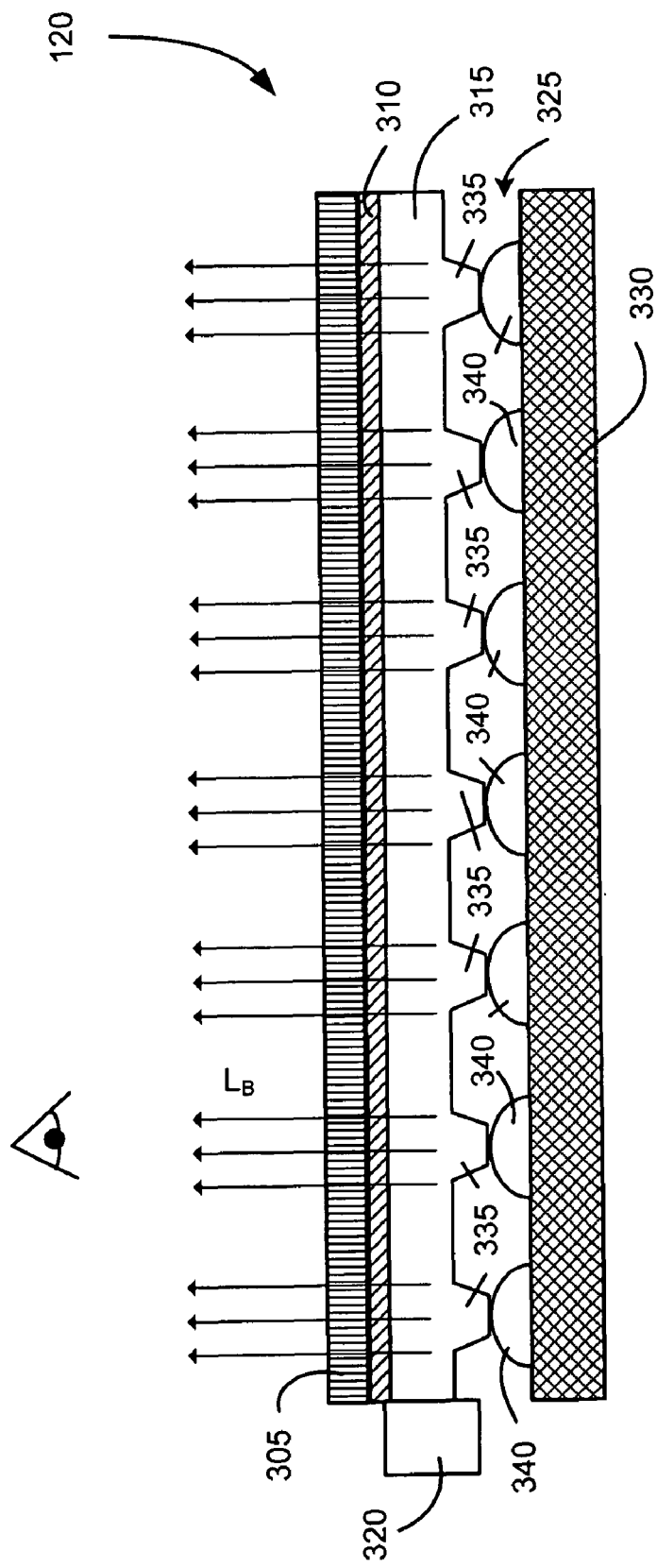
FIGS. 3A and 3B are side views of the keypad assembly of FIG. 1 in alternate modes of operation.
Figure 3B:
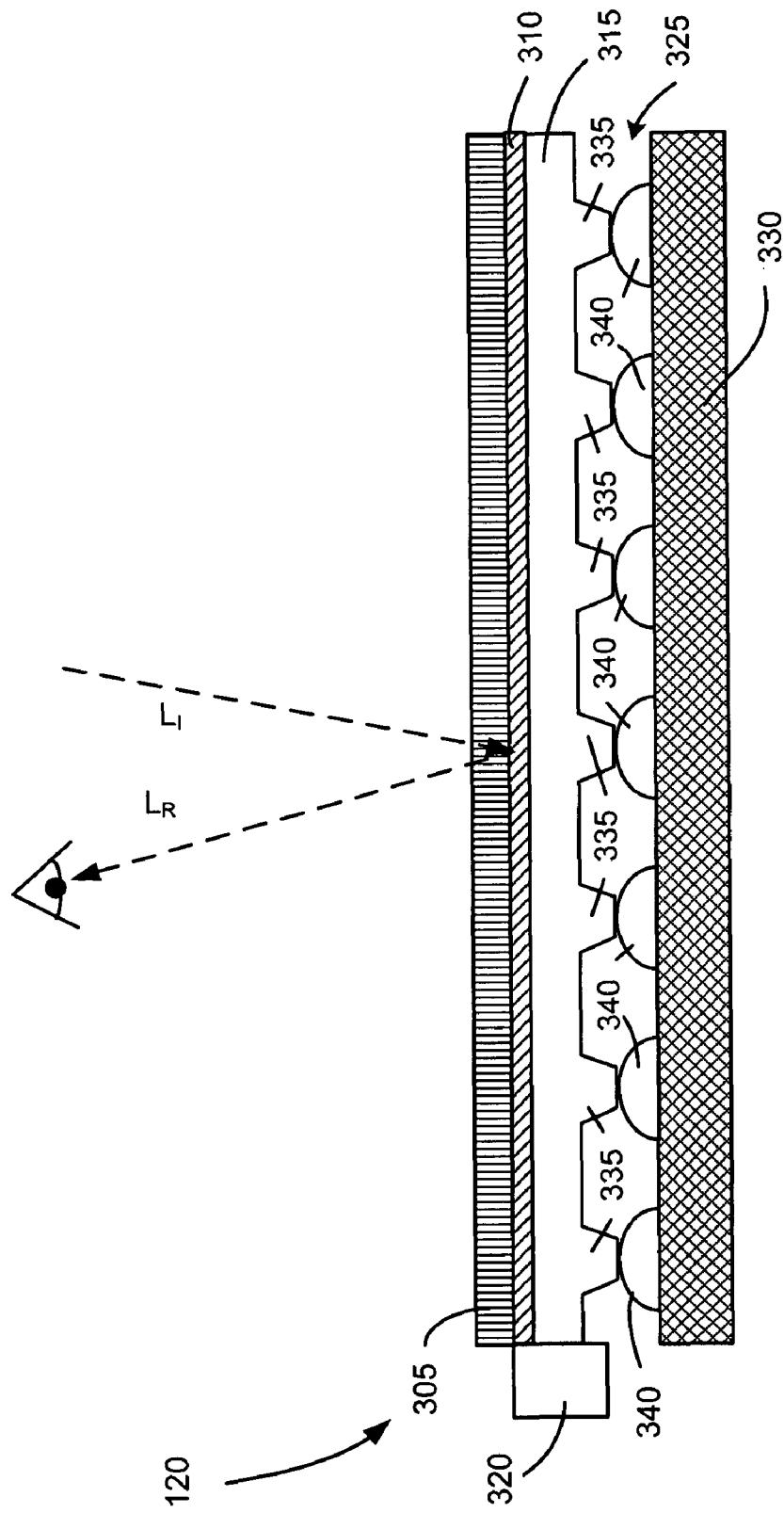

FIG. 3A is a side view of keypad assembly 120 of FIG. 1 according to one implementation during a first mode of operation. FIG. 3B is a side view of keypad assembly 120 of FIG. 1 according to one implementation during a second mode of operation. As illustrated in FIGS. 3A and 3B, keypad assembly 120 may include a keypad surface layer 305, an electrochromic layer 310, a light guide layer 315, a light source 320, a switch layer 325, and a keypad printed circuit board (PCB) 330. As described briefly above, keypad assembly 120 may be included or incorporated within housing 105 of mobile terminal 100 as shown in FIG. 1.

Keypad surface layer 305 may be formed on light guide layer 315 and electrochromic layer 310 and may include any structure or material for providing a user interface incorporating one or more tactile keys or buttons. In some implementations, keypad surface layer 305 may include a thin, uniform, layer with individual keys being separated graphically on a top surface of the keypad surface layer 305. In such an implementation, the individual keys on keypad assembly 120 may not be physically differentiated from each other at keypad surface layer 305. However, presses at appropriate regions of keypad surface layer 305 may correspond to presses of appropriate switches in switch layer 325.

In an alternative implementation, keypad surface layer 305 may include a number of distinct key elements supported by electrochromic layer 310 and/or light guide layer 315. In this implementation, portions of housing 105 may be provided between the key elements of keypad surface layer 305, to provide physical differentiation between the keys on keypad surface layer 305.

Each key region or key element of keypad surface layer 305 may include one or more transparent or translucent graphical elements thereon (examples of which are shown in FIG. 1). For example, keypad surface layer 305 may include various alpha-numeric or symbolic characters used in interfacing with mobile terminal 100. The graphical elements may be provided in the form of transparent or translucent inserts within appropriate regions of keypad surface layer 305. In this manner, light passing through light guide layer 315 from light source 320 may pass through the graphical elements, thereby illuminating the graphical elements in low-light environments.

In one implementation, the material from which the alphanumeric may be provided in a color that contrasts a color of a remaining portion of keypad surface layer 305 (i.e., those portions of keypad surface layer 305 not displaying graphical elements). For example, a majority of keypad surface layer 305 may be provided in a black or dark color, while the graphical elements may be provided in a translucent white or light color.

In one exemplary embodiment, light guide layer 315 may include a light dispersion layer configured to uniformly distribute light from light source 320. For example, light guide layer 315 may include a prism-type light dispersing element. In one implementation, light source 320 may include a side edge type back light device incorporating one or more light emitting diodes (LEDs) or a fluorescent or electroluminescent light source. In another embodiment, light source 320 may include one or more organic light emitting diodes formed within light guide layer 315

As illustrated in FIGS. 3A and 3B, light guide layer 315 may include a number of protrusions 335 corresponding to each key region/button on key surface layer 305. Switch layer 325 may include a number of metallic or otherwise conductive domes 340 or other suitable switch elements that correspond to each of protrusions 335. PCB layer 330 may include a number of contacts formed thereon (not shown) also corresponding to protrusions 335 and domes 340. Upon depression of a key region/button on key surface layer 305, a protrusion 335 corresponding to the selected key region/button may be deflected downward toward the corresponding dome 340 on switch layer 325. Deflection of dome 340 on switch layer 325 causes a top surface of dome 340 to come into physical contact with the corresponding contact on PCB 330, resulting in a signal to processing logic 210 indicating that the selected key has been pressed. Alternative embodiments of keypad assembly 120 are described below in relation to FIGS. 4-6.

Consistent with embodiments described herein, electrochromic layer 310 may include structures and materials configured to alternatively transition between substantially reflective and substantially transparent states upon application of a suitable voltage (or current) (e.g., from power supply 240) to layer 310. As illustrated, in one exemplary implementation, electrochromic layer 310 may be formed over light guide layer 315 and below key surface layer 305. Accordingly, while in a transparent state, light traveling from light guide layer 315 may pass through electrochromic layer 310 and through the translucent graphical elements on key surface layer 305. While in a reflective state, ambient light incident on key surface layer 305 and passing through the translucent graphical elements is reflected off of electrochromic layer 310 and returned back through key surface layer 305, thereby backlighting the graphical elements on key surface layer 305. Specificities regarding electrochromic layer 310 are set forth in additional detail below.

As illustrated in FIG. 3A, when mobile terminal 100 is in the first mode of operation (e.g., when light sensor 135 senses a level of ambient light below a predetermined threshold), electrochromic layer 310 may be provided in, or transitioned to, a substantially transparent state. In some implementations, this configuration may be a default configuration associated with mobile terminal 100, thereby affording maximum visibility of outer display 150 during low light conditions without requiring interaction by a user or state modification commands from processing logic 210. In other implementations, ambient condition information, for example information received via light sensor 135 may be used to trigger the above-described transition.

As illustrated, in the first mode of operation illustrated in FIG. 3A, light from light source 320 and dispersed through light guide layer 315 (designated by arrow ($L_B$) in FIG. 3A) may pass through electrochromic layer 310 and the translucent graphical elements on key surface layer 305 to illuminate the graphical elements.

As illustrated in FIG. 3B, when mobile terminal 100 is in the second mode of operation (e.g., when light sensor 135 senses a level of ambient light above the predetermined threshold), electrochromic layer 310 may be provided in, or transitioned to, a substantially reflective state. In the second mode of operation, ambient light incident on key surface layer 305 (designated by arrow ($L_I$) in FIG. 3B) may pass through the translucent graphical elements on key surface layer 305 and reflect off of electrochromic layer 310. The reflected light (designated by arrow ($L_R$) in FIG. 3B) may pass back through the graphical elements on key surface layer 305, thereby increasing visibility of the graphical elements in high ambient light (e.g., bright daylight) conditions.

In one implementation consistent with aspects described herein, processing logic 210 may turn off light source 320 when transitioning into the second mode of operation, thereby saving power for mobile terminal 100 during times in which ambient light is sufficient to adequately illuminate the graphical elements on key surface layer 305.

Figure 4:
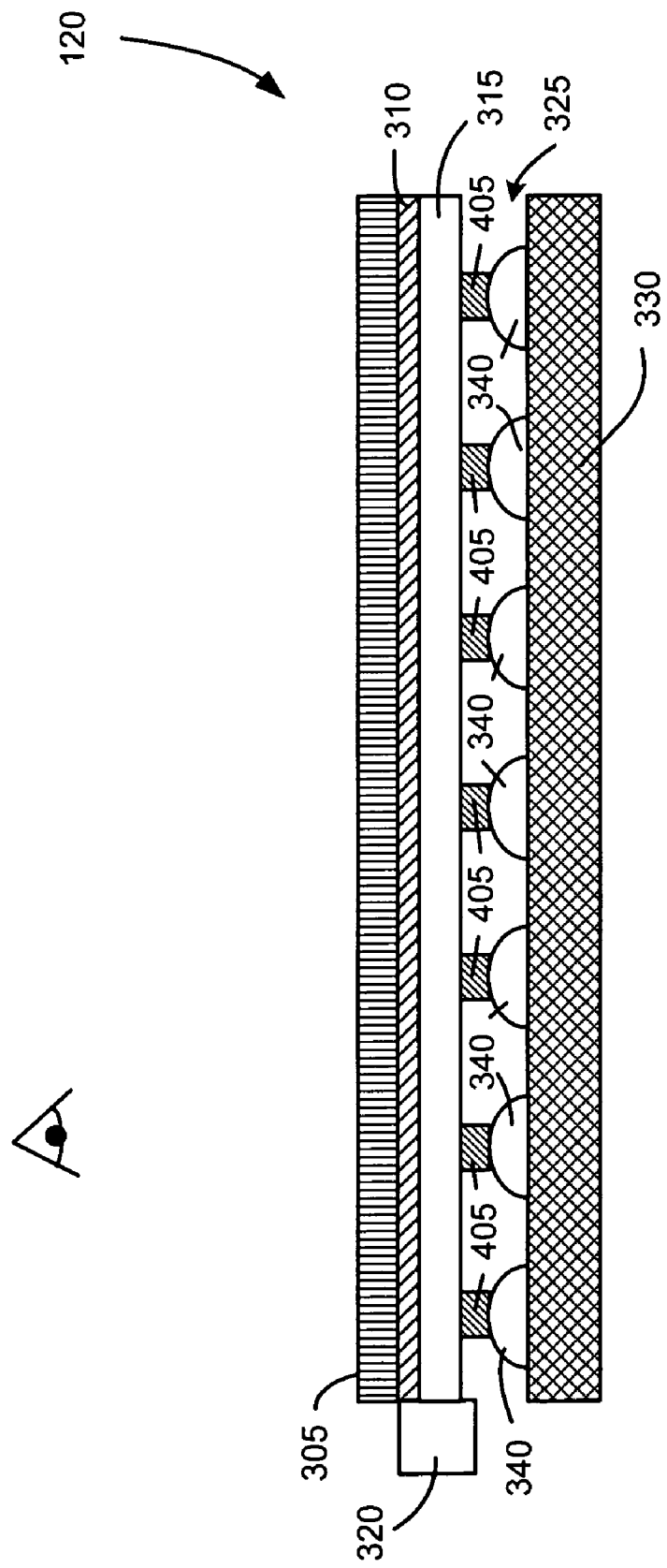
FIG. 4 is a side view of another exemplary implementation of the keypad assembly of FIG. 1.

FIG. 4 is a side view of keypad assembly 120 of FIG. 1 according to another implementation consistent with embodiments described herein. As illustrated in FIG. 4, keypad assembly 120 may include keypad surface layer 305, electrochromic layer 310, light guide layer 315, light source 320, switch layer 325, and keypad printed circuit board (PCB) 330. As described briefly above, keypad assembly 120 may be included or incorporated within housing 105 of mobile terminal 100 as shown in FIG. 1.

As compared to the embodiment described above in FIGS. 3A and 3B, the embodiment of FIG. 4 may include a substantially planar light guide layer 315 that does not include switch actuating protrusions 335. Instead, each conductive dome 340 may include an actuator element 405 provided thereon that corresponds to key regions/buttons on key surface layer 305.

Upon depression of a key region/button on key surface layer 305, corresponding portions of electrochromic layer 310 and light guide layer 315 may deflect downward and cause the corresponding actuator element 405 to move downward toward the corresponding dome 340 on switch layer 325. Deflection of dome 340 on switch layer 325 may cause a top surface of dome 340 to come into physical contact with the corresponding contact on PCB 330, resulting in a signal to processing logic 210 indicating that the selected key has been pressed.

Figure 5:
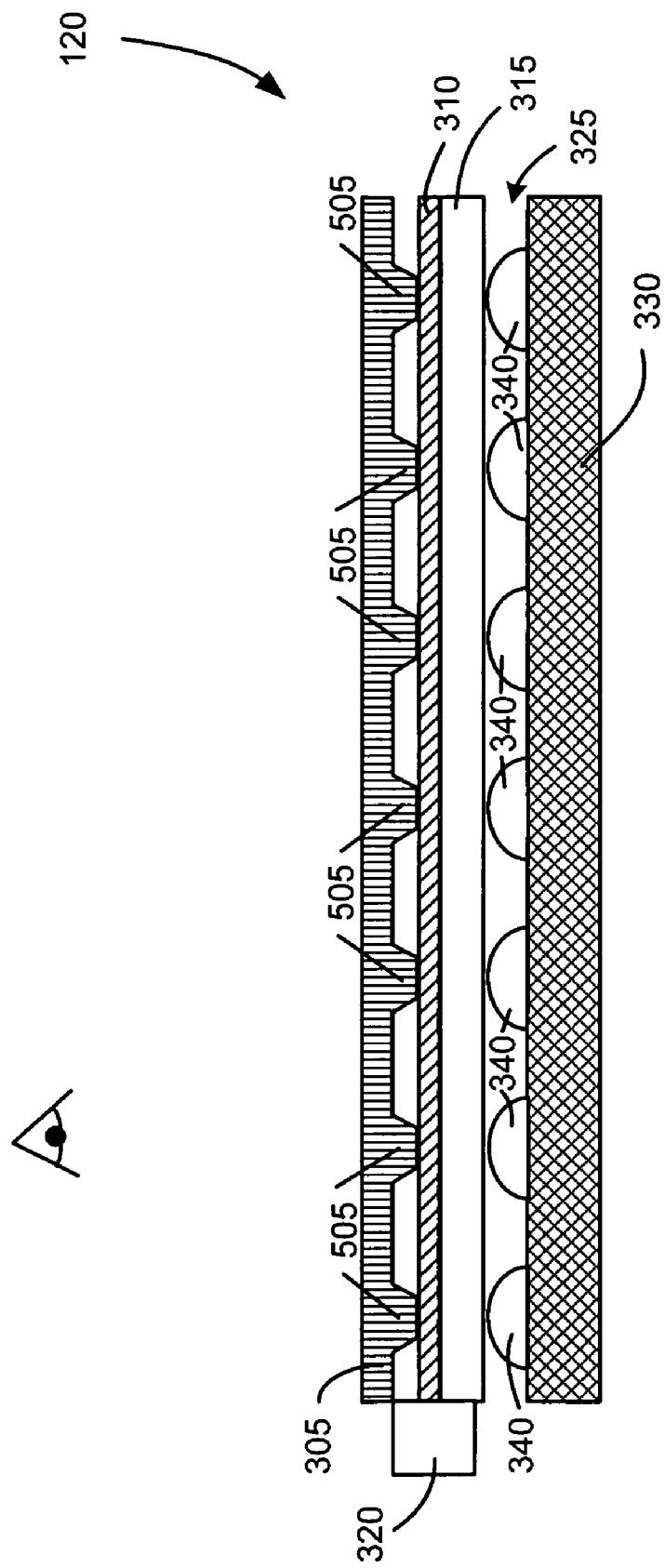
FIG. 5 is a side view of still another exemplary implementation of the keypad assembly of FIG. 1.

FIG. 5 is a side view of keypad assembly 120 of FIG. 1 according to yet another implementation consistent with embodiments described herein. As illustrated in FIG. 5, keypad assembly 120 may include keypad surface layer 305, electrochromic layer 310, light guide layer 315, light source 320, switch layer 325, and keypad printed circuit board (PCB) 330. As described briefly above, keypad assembly 120 may be included or incorporated within housing 105 of mobile terminal 100 as shown in FIG. 1.

As compared to the embodiment described above in FIGS. 3A and 3B, the embodiment of FIG. 4 may include a substantially planar light guide layer 315 that does not include switch actuating protrusions 335. Instead, key surface layer 305 may be provided with actuating protrusions 505 corresponding to key regions/buttons on key surface layer 305.

Upon depression of a key region/button on key surface layer 305, a corresponding protrusion 505 deflects portions of electrochromic layer 310 and light guide layer 315 downward. This deflection may cause a corresponding dome 340 on switch layer 325 to be similarly deflected. Deflection of dome 340 on switch layer 325 may cause a top surface of dome 340 to come into physical contact with the corresponding contact on PCB 330, resulting in a signal to processing logic 210 indicating that the selected key has been pressed.

Figure 6:
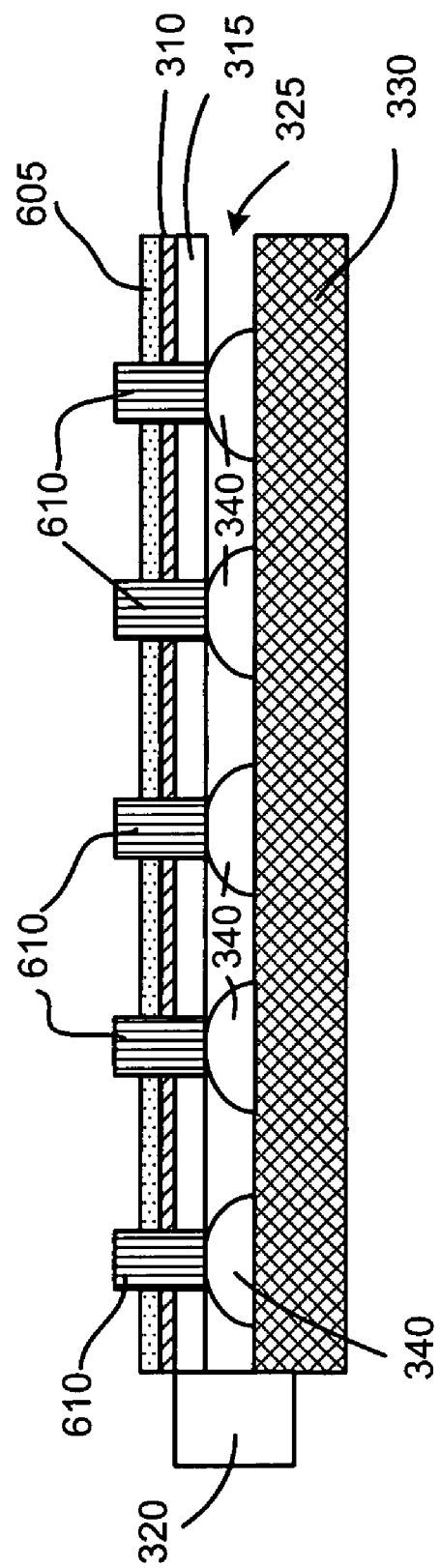
FIG. 6 is a side view of yet another exemplary implementation of the keypad assembly of FIG. 1.

FIG. 6 is a side view of keypad assembly 120 of FIG. 1 according to still another implementation consistent with embodiments described herein As illustrated in FIG. 6, keypad assembly 120 may include housing surface layer 605, key elements 610, electrochromic layer 310, light guide layer 315, light source 320, switch layer 325, and keypad printed circuit board (PCB) 330. As described briefly above, keypad assembly 120 may be included or incorporated within housing 105 of mobile terminal 100 as shown in FIG. 1.

As shown in FIG. 6, keypad assembly 120 may include a plurality of individual key elements 610 projecting from a housing surface layer 605. In this implementation, the graphical elements or identifiers associated with each key element 610 may be provided on a portion of housing surface layer 605 associated with each key element 610.

For example, housing surface layer 605 may include various alpha-numeric or symbolic characters used in interfacing with mobile terminal 100. The graphical elements may be provided in the form of transparent or translucent inserts within appropriate regions of housing surface layer 605 corresponding to adjacent key elements 610.

Key elements 610 may be provided over corresponding contact domes 340, such that depression of a key element 610 results in downward deflection of a corresponding contact dome 340. Deflection of dome 340 on switch layer 325 causes a top surface of dome 340 to come into physical contact with the corresponding contact on PCB 330, resulting in a signal to processing logic 210 indicating that the selected key has been pressed. may be pro As shown in FIG. 6, areas of keypad assembly 120 adjacent to or surrounding key elements 610 may be provided as non-moving elements. More specifically, housing surface 605, electrochromic layer 310 and light guide layer 315 may be provided in non-deflecting regions of keypad assembly 120. Accordingly, in this implementation, keypad assembly 120 may be provided with a minimal thickness between PCB layer 330 and a top surface of housing surface layer 605, since no deflection space is required for those elements of keypad assembly 120.

Figure 7:
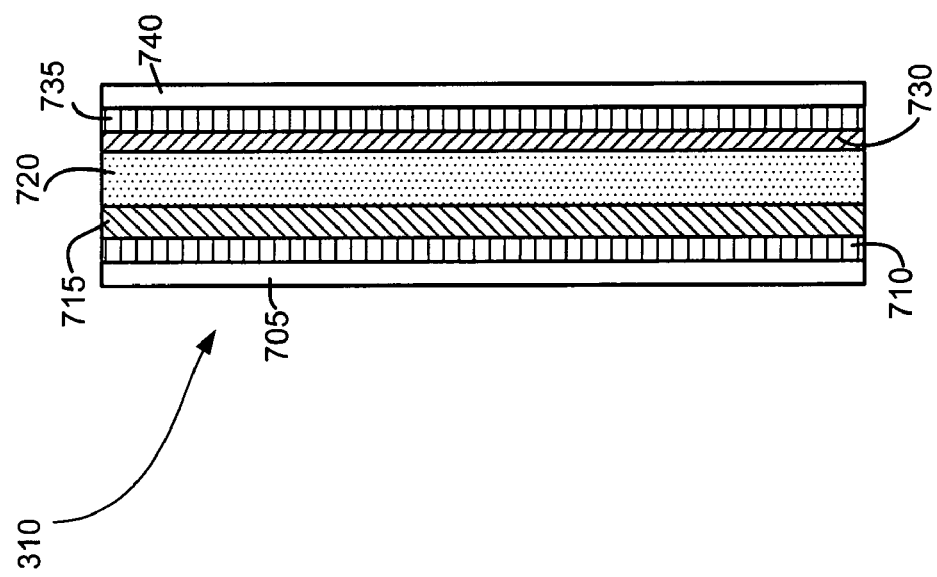
FIG. 7 is a side view of an exemplary implementation of the electrochromic layer of FIGS. 3A-6.

FIG. 7 illustrates one exemplary implementation of electrochromic layer 310 consistent with implementations described herein. As illustrated in FIG. 7, electrochromic layer 310 may include a substrate 705, a first transparent conductor layer 710, an ion storage layer 715, an ion conducting/electrolyte layer 720, an electrochromic layer 730, a second transparent conductor layer 735, and a transparent substrate 740. In some implementations, substrate 705 may be substantially transparent and may be included in light guide layer 315. In such an implementation, layers 710-740 may be applied as one or more films on light guide layer 315.

In one embodiment, transparent conductor layers 710 and 735 may include any suitable transparent conductive material, such as indium tin oxide (ITO). Conductor layers 710 and 735 may be formed via any suitable process, such as sputtering, on layers 705 and 730, respectively. Ion storage layer 715 may include a substantially transparent material, such as hydrated nickel oxide, vanadium pentoxide, etc., implanted with ions, the presence of which in electrochromic layer 730 effects the desired changed in optical characteristics. For example, ion storage layer 715 may be implanted with atoms of materials, such as lithium, sodium, silver, potassium, magnesium, or hydrogen.

Electrochromic layer 730 may include a reflective transition metal hydride material or alloy, such as a nickel magnesium alloy, etc. In a natural state, the reflective transition metal hydride material of layer 730 exists in a reflective state. However, upon application of a suitable voltage or current across ion storage layer 715 and electrochromic layer 730, at least a portion of the ions initially present in ion storage layer 715 may be transferred across ion conducting/electrolyte layer 720 to electrochromic layer 730. For example, hydrogen ions ($H^+$) or lithium ions ($L^+$) present in ion storage layer 715 may be driven across ion conducting/electrolyte layer 720 and into electrochromic layer 730. Upon injection of a suitable number of these ions, electrochromic layer 730 may transition into a substantially transparent state. A reversal of the applied voltage or current may effect a reverse flow of ions back into ion storage layer 715, thereby returning electrochromic layer 730 to a substantially reflective state. Once injection of ions in either direction is completed, no sustained voltage is required to maintain electrochromic layer 730 in its present state (i.e., reflective or transparent) of operation. In other words, the transition is nonvolatile.

Accordingly, based on appropriate application of voltages, electrochromic layer 310 may be selectively manipulated into respective reflective or transparent states depending on a mode of operation of mobile terminal 100. In one exemplary embodiment, electrochromic layer 310 may include reflective, transitional metal hydride layers (e.g., electrochromic layer 730), and may have a thickness of approximately 500 to 2500 nanometers. Furthermore, electrochromic layer 310, while in a reflective state, may have resulting reflectance of approximately 80-100% and, while in a transparent state, may have a transmittance of approximately 80-100%. Switching times may be on the order of 50 milliseconds to 2000 milliseconds and switching voltages may be on the order of 0.25-3.0 volts.

Figure 8:
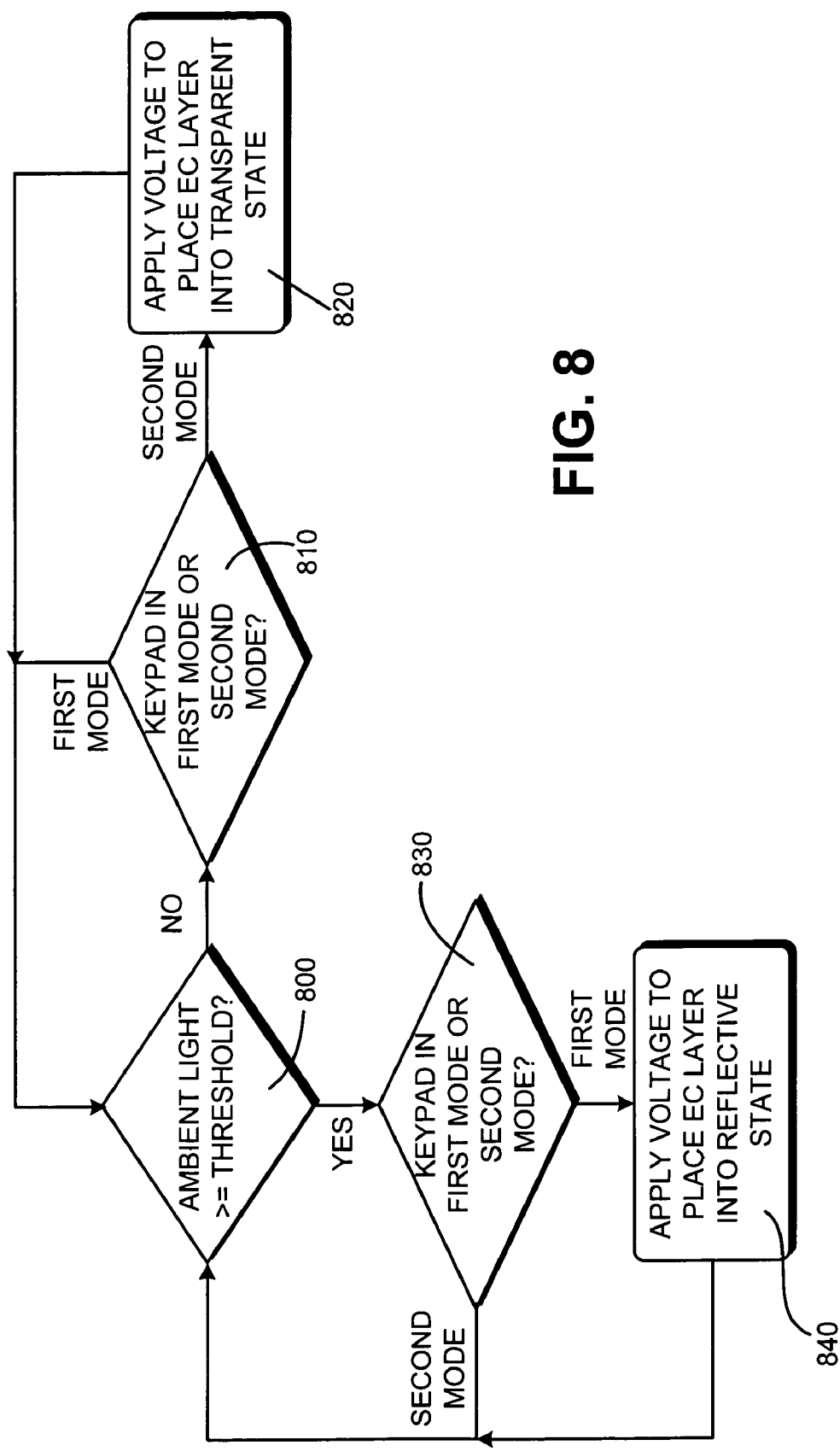
FIG. 8 is a flow diagram illustrating one exemplary implementation of processing for providing a switchable keypad backlighting system in a mobile terminal in accordance with embodiments described herein.

FIG. 8 is a flow diagram illustrating one exemplary implementation of processing for providing a switchable keypad backlighting system in a mobile terminal in accordance with embodiments described herein. Processing may being with a periodic determination of whether a level of ambient light received via, for example, light sensor 135, meets or exceeds a predetermined threshold level (block 800). For example, in one implementation, processing logic 210 may periodically poll light sensor 135 for a value corresponding to a current amount of ambient light incident thereupon. Processing logic 210 may then compare the received value to a threshold value corresponding to a bright light condition. In some implementations, processing logic 210 may require a determination of a bright light condition for a predetermined period of time, to avoid operation mode changes to the keypad backlight in the presence of short bursts of light.

If it is determined that a bright light condition does not exist (block 800—NO), processing logic 210 may determine whether keypad assembly 120 is presently in a first (transparent) mode of operation (i.e., not bright light mode) or a second (reflective) mode of operation (i.e., a bright light mode) (block 810). In one implementation, information regarding a current state of keypad assembly 120 may be maintained as a value in a table or register stored in, for example, memory 220.

When it is determined that keypad assembly 120 is currently in a first (transparent) mode of operation (block 810—1$^{st}$ Mode), no action is taken and processing returns to block 800 for a next polling cycle. However, when it is determined that keypad assembly 120 is currently in a second (reflective) mode of operation (block 810—2$^{nd}$ Mode), processing logic 210 may cause a suitable voltage to be applied to electrochromic layer 310 to place electrochromic layer 310 into the transparent state (block 820). Processing may then return to block 800 for a next polling cycle.

Returning to block 800, when it is determined that a bright light condition does exist (block 800—YES), processing logic 210 may determine whether keypad assembly 120 is presently in a first (transparent) mode of operation (i.e., not bright light mode) or a second (reflective) mode of operation (i.e., a bright light mode) (block 830).

When it is determined that keypad assembly 120 is currently in a second (reflective) mode of operation (block 830—2$^{nd}$ Mode), no action is taken and processing returns to block 800 for a next polling cycle. However, when it is determined that keypad assembly 120 is currently in a first (transparent) mode of operation (block 830—1$^{st}$ Mode), processing logic 210 may cause a suitable voltage to be applied to electrochromic layer 310 to place electrochromic layer 310 into the reflective state (block 840). Processing may then return to block 800 for a next polling cycle.

As briefly described above, in one implementation consistent with aspects described herein, light source 320 may be activated when electrochromic layer 310 is placed into or maintained in the first (transparent) mode of operation and deactivated when electrochromic layer 310 is placed into or maintained in the second (reflective) mode of operation, thereby saving power when the backlight is not necessary to illuminate keypad assembly 120.

CONCLUSION

Implementations consistent with embodiments described herein provide increased viewability of keypad or other displays or input devices by providing electronic switching of a electrochromic reflective layer associated with the input device. In this manner, a maximum degree and type of backlight for the input device may be enabled. This has the advantage of increasing usability of the input device in a variety of lighting conditions and requires lower current consumption that embodiments in which high ambient light is countered by increased backlight brightness, because in those environments, the artificial backlighting may be turned off or otherwise reduced. In some embodiments, control of the electronic switching of the electrochromic reflective layer may be performed in substantially real-time based on a mode of operation, a physical configuration, or lighting conditions associated with the input device.

The foregoing description of the embodiments provides illustration and description, but is not intended to be exhaustive or to limit the invention to the precise form disclosed. Modifications and variations are possible in light of the above teachings or may be acquired from practice of the invention.

For example, while the above-described embodiments primarily relate to mobile device, such as mobile telephones, aspects described herein may also be applicable to other technologies suitable for variably lit environments. For example, outdoor signage may be provided with a transflective display (e.g., a LCD, a LED display, an OLED display, etc.) a having an electrochromic layer configured to enhance viewability of the signage in the presence of high levels of ambient light.

Furthermore, while a series of blocks and/or processes have been described in FIG. 8, the order of the blocks and/or processes may be modified in other implementations.

It will also be apparent to one of ordinary skill in the art that various embodiments, as described above, may be implemented in cellular communication devices/systems, methods, and/or computer program products. Accordingly, the present invention may be embodied in hardware and/or in software (including firmware, resident software, micro-code, etc.). Furthermore, various embodiments may take the form of a computer program product on a computer-usable or computer-readable storage medium having computer-usable or computer-readable program code embodied in the medium for use by or in connection with an instruction execution system. The actual software code or specialized control hardware used to implement aspects consistent with the embodiments described herein is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A display assembly, comprising:
   a backlight layer;
   an electrochromic layer formed over the backlight layer, where the electrochromic layer is switchable between a substantially transparent state and a substantially reflective state upon application of a switching voltage to the electrochromic layer;
   a surface layer formed over the electrochromic layer and including at least one substantially translucent graphical element thereon;
   a power supply;
   a light sensor; and
   a processor configured to:
      compare an amount of ambient light received by the light sensor with a predetermined threshold level;
      determine whether the amount of ambient light received by the light sensor meets or exceeds the predetermined threshold level;
      determine a current state of the electrochromic layer; and
      perform at least one of the following steps:
         in response to determining both the amount of ambient light received by the light sensor meets or exceeds the predetermined threshold level and the current state of the electrochromic layer is the substantially transparent state, initiate application of a first voltage to the electrochromic layer to switch the electrochromic layer to the substantially reflective state; and in response to determining both the amount of ambient light received by the light sensor does not meet or exceed the predetermined threshold level and the current state of the electrochromic layer is the substantially reflective state, initiate application of a second voltage to the electrochromic layer to switch the electrochromic layer to the substantially transparent state.

2. The display assembly of claim 1, where when the electrochromic layer switches to the substantially transparent state, viewing of the graphical element on the surface layer is enhanced by light from the backlight layer.

3. The display assembly of claim 1 where when the electrochromic layer switches to the substantially reflective state, viewing of the graphical element on the surface layer is enhanced by ambient light reflected from the electrochromic layer.

4. The display assembly of claim 3, where when the electrochromic layer switches to the substantially reflective state, the backlight layer is deactivated.

5. The display assembly of claim 1, where the surface layer includes a keypad surface layer and where the at least one graphical element corresponds to a number of keys on the keypad surface layer.

6. The display assembly of claim 5, further comprising:
a printed circuit board (PCB) layer including a number of contacts corresponding to the number of keys; and
a switching layer formed over the PCB layer and including a number of switch elements corresponding to the number of contacts and the number of keys,
where depression of a selected key of the number of keys results in physical contact between the switch element and the contact corresponding to the selected key.

7. The display assembly of claim 6, where one of the backlight layer or the surface layer includes a number of protrusions corresponding to the number of switch elements, the number of contacts, and the number of keys, where the number of protrusions facilitate contact between the number of keys and the number of switch elements.

8. The display assembly of claim 1, where the surface layer comprises a number of distinct key elements.

9. The display assembly of claim 1, where the electrochromic layer comprises a reflective transition metal hydride.

10. The display assembly of claim 9, where the reflective transition metal hydride comprises a magnesium nickel alloy.

11. The display assembly of claim 1, where the electrochromic layer exhibits a reflectance of approximately 80-100% while in the substantially reflective state and a transmittance of approximately 80-100% while in the substantially transparent state.

12. The display assembly of claim 1, where the processor is further configured to:
in response to determining both the amount of ambient light received by the light sensor does not meet or exceed the predetermined threshold level and the current state of the electrochromic layer is the substantially transparent state, maintain the electrochromic layer in the substantially transparent state.

13. The display assembly of claim 12, where the processor is further configured to:
in response to determining both the amount of ambient light received by the light sensor meets or exceeds the predetermined threshold level and the current state of the electrochromic layer is the substantially reflective state, maintain the electrochromic layer in the substantially reflective state.

14. The display assembly of claim 1, where the electrochromic layer comprises:
a first transparent conductor layer;
an ion storage layer formed over the first transparent conductor layer;
an ion conducting layer formed over the ion storage layer;
a reflective electrochromic layer formed over the ion conducting layer; and
a second transparent conductor layer formed over the reflective electrochromic layer, where the ion storage layer and the reflective electrochromic layer are configured to receive the switching voltage from the power supply.

15. A device comprising:
a keypad assembly;
a light sensor;
a processor; and
a power supply,
where the keypad assembly comprises:
a surface layer including a plurality of substantially translucent graphical elements thereon,
an electrochromic layer formed below the surface layer, and
a backlighting assembly formed below the electrochromic layer,
where the electrochromic layer is switchable between a substantially transparent state and a substantially reflective state upon a command from the processor to apply a switching voltage from the power supply to the electrochromic layer, the state being selected based on an ambient lighting condition of the device,
where the processor is configured to:
compare an amount of ambient light received by the light sensor with a predetermined threshold level;
determine whether the amount of ambient light received by the light sensor meets or exceeds the predetermined threshold level;
determine a current state of the electrochromic layer; and
perform at least one of the following steps:
in response to determining both the amount of ambient light received by the light sensor meets or exceeds the predetermined threshold level and the current state of the electrochromic layer is the substantially transparent state, initiate application of a first voltage to the electrochromic layer to switch the electrochromic layer to the substantially reflective state; and
in response to determining both the amount of ambient light received by the light sensor does not meet or exceed the predetermined threshold level and the current state of the electrochromic layer is the substantially reflective state, initiate application of a second voltage to the electrochromic layer to switch the electrochromic layer to the substantially transparent state.

16. The device of claim 15, where the processor is configured to activate the backlighting assembly when the electrochromic layer is in the substantially transparent state and deactivate the backlighting assembly when the electrochromic layer is in the substantially reflective state.

17. The device of claim 15, where the electrochromic layer comprises at least a reflective transition metal hydride layer.

18. The device of claim 15, further comprising:

a printed circuit board layer comprising a plurality of contacts that correspond to the plurality of graphical elements, and a switching layer, formed over the printed circuit board layer, that includes a plurality of switching elements that correspond to the plurality of graphical elements and the plurality of contacts, where depression of one of the plurality of graphical elements results in contact between a corresponding one of the plurality of contacts and a corresponding one of the plurality of switching elements.

19. A method, comprising:

comparing, by a light sensor associated with a display, an amount of ambient light received by the light sensor to a predetermined threshold level, where the display includes an electrochromic layer and a surface layer having a number of substantially translucent graphical elements formed thereon;

determining whether the amount of ambient light received by the light sensor meets or exceeds the predetermined threshold level, where the display includes a surface layer having a number of substantially translucent graphical elements formed thereon and an electrochromic layer;

determining a current state of an electrochromic layer associated with the display; and performing at least one of the following steps:

in response to determining both the amount of ambient light received by the light sensor meets or exceeds the predetermined threshold level and the current state of the electrochromic layer is the substantially transparent state, initiating application of a first voltage to the electrochromic layer to switch the electrochromic layer to the substantially reflective state; and in response to determining both the amount of ambient light received by the light sensor does not meet or exceed the predetermined threshold level and the current state of the electrochromic layer is the substantially reflective state, initiating application of a second voltage to the electrochromic layer to switch the electrochromic layer to the substantially transparent state.

20. The method of claim 19, further comprising:

activating a backlight assembly formed below the electrochromic layer when the electrochromic layer is placed into the substantially transparent state to illuminate the number of substantially translucent graphical elements; and deactivating the backlight assembly when the electrochromic layer is placed into the substantially reflective state.

\* \* \* \* \*